United States Patent [19]

Van Gils et al.

[11] Patent Number: 4,545,774
[45] Date of Patent: Oct. 8, 1985

[54] METHOD OF MANUFACTURING A LOW-PRESSURE MERCURY VAPOR DISCHARGE LAMP AND LOW-PRESSURE MERCURY VAPOR DISCHARGE LAMP MANUFACTURED BY THIS METHOD

[75] Inventors: Wilhelmus M. J. Van Gils; Adrianus J. T. Mollet; Johannes A. M. Ridders, all of Roosendaal, Netherlands

[73] Assignee: U.S. Philips Corporation, New York, N.Y.

[21] Appl. No.: 555,843

[22] Filed: Nov. 28, 1983

[30] Foreign Application Priority Data

Dec. 2, 1982 [NL] Netherlands .......................... 8204673

[51] Int. Cl.⁴ ............................................... H01J 9/26
[52] U.S. Cl. ........................................ 445/22; 445/26; 445/6; 313/493; 65/42; 65/56
[58] Field of Search ............... 445/6, 22, 26; 313/493; 65/42, 56

[56] References Cited

U.S. PATENT DOCUMENTS 3,237,042  2/1966  Martyny et al. .................... 313/493
4,324,447  4/1982  van der Wolf ........................ 445/26

FOREIGN PATENT DOCUMENTS 957958  5/1964  United Kingdom ................ 313/493

Primary Examiner—Kenneth J. Ramsey
Assistant Examiner—Kurt Rowan
Attorney, Agent, or Firm—Robert S. Smith

[57] ABSTRACT

A method of manufacturing a low-pressure mercury vapor discharge lamp having a discharge envelope sealed in a vacuum-tight manner and comprising four substantially parallel co-extending glass tube parts (1,2,3,4), adjacent tube parts (1,2) being connected through a cross-coupling (5) to each other so that during operation of the lamp the major part of each of the tube parts (1,2,3,4) as well as the cross-couplings (5,6,7) are traversed by the discharge.

According to the invention, first a cross-coupling (24) is established between a first tube part (20) having a length $l_1$, which is sealed at one end (20a) and comprises at the other end an electrode (22), and a tube part (18) likewise sealed at one end (18a) having a length $l_1+l_2$, which tube part (18) comprises at its other end an electrode (16), the tube part (18) being subdivided at (18b) into two tube parts, one of which has a length $l_1$ (26) and the other has a length $l_2$ (27), the tube part having a length $l_1$ (26) being removed by the use in a next cycle, while the remaining coupled tube parts (20,27) are arranged beside a pair (21,28) formed in a corresponding manner and are connected to each other by a cross-coupling (29).

2 Claims, 6 Drawing Figures

METHOD OF MANUFACTURING A LOW-PRESSURE MERCURY VAPOR DISCHARGE LAMP AND LOW-PRESSURE MERCURY VAPOR DISCHARGE LAMP MANUFACTURED BY THIS METHOD

The invention relates to a method of manufacturing a low-pressure mercury vapour discharge lamp having a discharge vessel sealed in a vacuum-tight manner and comprising four substantially parallel and co-extending glass tube parts, adjacent tube parts being inter-connected by a cross-coupling extending transversely to the longitudinal axis so that during operation of the lamp at least the major part of each of the tube parts and the cross-couplings are traversed by the discharge, in which method a cross-coupling between two tube parts is established after the tube parts to be coupled have been provided with a luminescent layer and sealed at one end. The invention further relates to a low-pressure mercury vapour discharge lamp manufactured by means of this method. The aforementioned method is known from the Dutch Patent Application No. 7902571 (PHN.9409) laid open for public inspection.

In the lamp, the said parallel tube parts are located, for example, in one flat plane. In another configuration, the tube parts are arranged, for example, on a square. The cross-couplings apply to such an area of the tube parts that during operation of the lamp the major part of the tube parts is traversed by the discharge.

In the aforementioned Dutch Patent Application, a method is described of manufacturing a low-pressure discharge lamp, whose discharge vessel mainly consists of two adjacent and parallel extending sealed tube parts which are connected to each other by means of a cross-coupling. During operation, a U-shaped discharge path is present in the discharge envelope. In the method, the starting members are two tube parts which are coated with a luminescent material and which are first provided at one end with a stem (the part of the discharge envelope carrying the electrode, possibly provided with an electrode band etc.) comprising an exhaust tube and are then sealed at the other end. Subsequently, at a certain small distance from this sealed end, the wall of each tube part is provided with an opening which is provided with a raised edge of glass by heating and by exertion of a certain excess pressure on the wall from the inner side of the tube. The raised edges of each of the tube parts are arranged so as to face each other and are fused together. Thus, in a comparatively simple manner a lamp having a discharge vessel consisting of two parallel tube parts connected to each other can be manufactured in a mass production process.

In the afornentioned Patent Application, it is further described that by the method mentioned therein also three or more parallel tube parts can be connected to each other. In this case, according to this Patent Application, a lamp is obtained, for example, having a discharge vessel which comprises four parallel co-extending tube parts located in one flat plane or a lamp having a discharge vessel composed of four tube parts connected to each other and arranged on a square. The manner in which these comparatively complicated discharge vessels are manufactured (for example, in a mass-production process) is not described in this Application, however.

The invention has for its object to provide a method of manufacturing a lamp having a discharge envelope of the aforementioned configuration, which lamp can be manufactured in a comparatively simple manner in a mass-production process.

Therefore, according to the invention, the method of the kind mentioned in the opening paragraph of this description is characterized in that first a cross-coupling is formed between a first tube part sealed at one end and having a length $l_1$, whose other end is provided with a stem with an exhaust tube, and a tube part likewise sealed at one end and having a length $l_1+l_2$, whose other end is likewise provided with a stem with an exhaust tube, which tube parts are arranged adjacent and parallel to each other and are then connected to each other through the cross-coupling which is at or near the sealed end of the first tube part, after which the tube part having a length $l_1+l_2$ is subdivided so that a second tube part having a length $l_1$ is obtained which is sealed at one end and carries at its other end the stem with the exhaust tube, which tube part is removed, a tube part having a length $l_2$ sealed at both ends then being obtained which is already connected to the first tube part having a length $l_1$ through a cross-coupling, after which a second pair of tube parts of the same configuration is arranged mirror-symmetrically adjacent the first pair, a cross-coupling being established between the parallel extending tube parts having a length $l_2$.

The method according to the invention is particularly suitable to be used in a continuous mass-production process. The use of the method of manufacturing a lamp having a discharge vessel comprising a comparatively large number of tube parts requires only a few drastic changes as compared with the method of manufacturing a lamp having a discharge vessel comprising only two coextending tube parts arranged parallel to each other.

The tube parts having a length $l_1$ which are left after subdivision and are initially removed can be directly utilized as a first tube part having a length $l_1$ in a next cycle, which is advantageous in the mass-production process. In the method, no sealed tube parts (provided with stem, exhaust tube and the like) are destroyed.

In the method according to the invention, the tube parts carrying an exhaust tube are arranged in such a position that the cross-couplings can be formed in the aforementioned manner between adjacent tube parts, the required excess pressure inside the tube parts being created in a simple manner through the exhaust tubes. For this purpose, the exhaust tubes are connected, for example, to a compressed-air apparatus.

By means of the method according to the invention, a lamp is obtained having a discharge vessel composed of four parallel co-extending tube parts, in which event those tube parts which are provided with a stem with an exhaust tube (which after the "pumping" operation is sealed, after which the mercury is introduced into the discharge envelope, for example, by means of a method described in GB-PS No. 1,475,458) have a length $l_1$, whilst the remaining tube parts have a length $l_2$. An example of a lamp obtained by means of the method has a discharge vessel comprising four tube parts located in one flat plane, in which event the tube parts comprising a stem are located on the outer side and the tube parts having a length $l_2$ are arranged adjacent each other between the tube parts having a length $l_1$.

When the tube part having a length $l_1+l_2$ is subdivided, use is preferably made of a method in which a comparatively small zone of the wall of this tube part is heated whilst rotating the tube part about its longitudinal axis, after which the ends are pulled away from each other. In this case, end walls are formed at the subdivision area (in the tube parts $l_1$ and $l_2$, respectively, which are then obtained), which are provided with a luminescent layer. No particles of the luminescent material are then enclosed in the glass of these closure walls and fracture is avoided after cooling.

In a preferred embodiment of the method, the tube parts all have substantially the same length l, whilst, before the first cross-coupling is formed between the tube parts 1 and 2l, the tube part having a length 2l is formed after the ends of a tube having a length 4l have first been provided with a stem with an exhaust tube, after which this tube is divided into two halves in the manner described above, the tube part having a length 2l then being divided into two halves after the first cross-coupling has been formed.

In this embodiment of the method, the tube parts having lengths 2l and l coupled to each other are grouped as pairs. According to this embodiment it is possible to manufacture these pairs, after the tube having a length 4l has been subdivided, in two relatively separated identical production lines. The embodiment further has the advantage that in the manufacture of the lamp is a tube having a comparatively large length, as a result of which a luminescent layer can be applied in the manner usual for low-pressure mercury vapour discharge lamps.

The invention will be described more fully with reference to the drawing.

Figure 1:
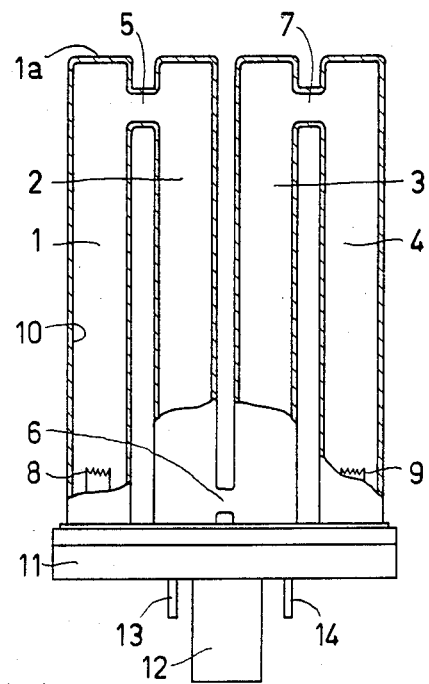
FIG. 1 shows a low-pressure mercury vapour discharge lamp manufactured by means of an embodiment of a method according to the invention.

The lamp shown in FIG. 1 has a lamp vessel comprising four parallel co-extending tube parts 1, 2, 3 and 4 located in one flat plane. These tube parts are connected to each other by cross-couplings 5, 6 and 7, extending substantially transversely to the walls of said discharge tubes. The electrodes 8 and 9 are arranged at the same end of the lamp. During operation of the lamp, a discharge is present between the electrodes, which traverses by far the greater part of the tube parts 1, 2, 3 and 4. Starting from the electrode 8, the discharge first passes through the tube part 1 upwards, through the cross-coupling 5 to the tube part 2 and downwards, through the cross-coupling 6 to the tube part 3 and again upwards and then through the cross-coupling 7 via the tube part 4 to the electrode 9. The inner wall of the tube parts (among which the inner wall of the sealed ends in the form of an end face, such as 1a) and the cross-coupling are coated with a luminescent layer 10, which converts the ultraviolet radiation produced in the mercury discharge into visible light. The cross-couplings 5, 6 and 7 are located at a certain distance from a sealed end of a tube part (cf. for example cross-coupling 5 and end 1a). In this manner, a comparatively cool wall portion (1a) of the discharge envelope is obtained, as a result of which the mercury vapour pressure is stabilized at a most favourable value during operation of the lamp. A synthetic lamp base 11 is secured on the lower side of the discharge envelope. The lamp base is provided with a projecting wall portion 12 in which a starter (not shown) is present. Two current-supply pins 13 and 14 are provided on either side of the latter (see also Dutch Patent Application No. 8003277 laid open for public inspection).

Figure 2E:
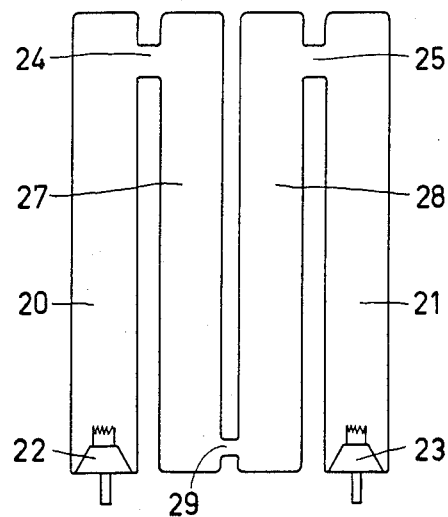
FIGS. 2a to 2e show a number of successive stages of the method according to the invention for manufacturing the lamp shown in FIG. 1.
Figure 2A:
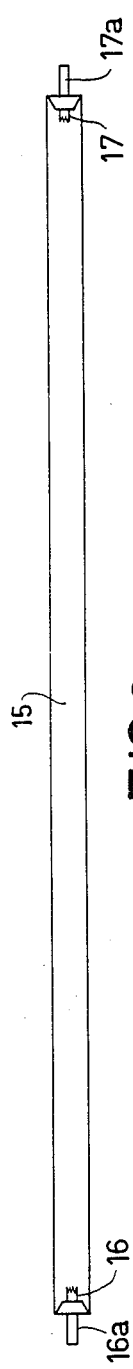
Figure 2B:
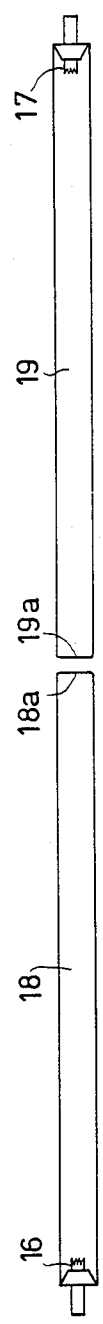

FIG. 2a shows a stretched glass tube 15 having a length equal to 4l, whose inner wall is coated with the luminescent layer in a usual manner. During the coating process, a luminescent material is first brought into a suspension. A binder (such as nitrocellulose) is further dissolved in the suspension medium) such as butyl acetate). The suspension is applied in the form of a layer and is then dried and sintered. Subsequently, the stems are formed. These stems are provided with electrodes (16, 17) and exhaust tubes 16a and 17a, which have not been closed. The tube 15 is then subdivided into two halves whilst rotating about its longitudinal axis and pulled apart into two parts 18 and 19 each having a length 2l. In each of the parts, a sealed end (18a and 19a, respectively) is formed (FIG. 2b).

Figure 2C:
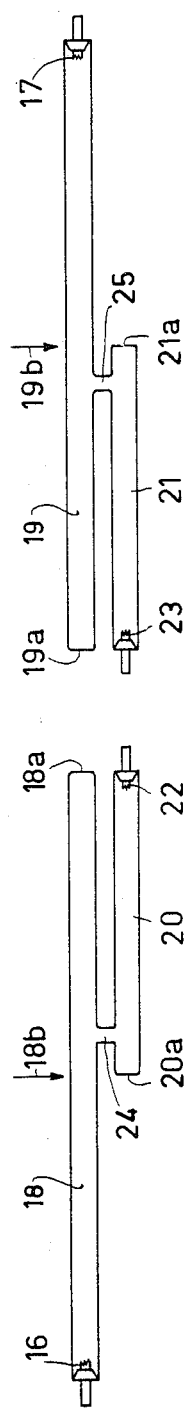
Figure 2D:
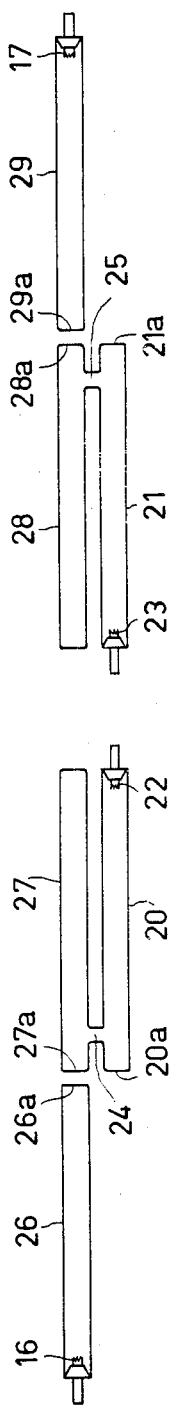

Subsequently, a tube part 20 and 21, respectively, having a length $l_2 = l$ is arranged parallel to and adjacent the tube part 18 and the tube part 19, respectively (FIG. 2c). These tube parts are provided at one end with an electrode 22 and 23, respectively, and an exhaust tube and are sealed at their other end (designated by 20a and 21a, respectively). The tube parts 18 and 20 are connected to each other by the cross-coupling 24, while the tube parts 19 and 21 are connected to each other by the cross-coupling 25. These cross-couplings are established by means of a method according to Dutch Patent Application No. 7902571 laid open for public inspection, in which an opening with a raised edge is blown in each tube part. In this case, a certain excess pressure on the inner wall is created by means of compressed air which is supplied through the exhaust tubes. The tube part 18 (and 19 respectively) having a length 2l is then subdivided into two halves (by heating the wall at 18b, 19b) to form parts 26 and 27 (and 28 and 29 respectively) and the ends of these parts are sealed in a vacuum-tight manner. These ends are designated by 26a and 27a (and 28a and 29a, respectively). The parts 27 and 28 are then sealed at both ends (FIG. 2d). The parts 26 (and 29, respectively) having a length l are used in the next cycle. They then have the function which the parts 20 and 21 have in the present cycle described. Consequently, through two separated identical production lines, two pairs of tube parts of the same configuration are formed (each tube part moreover has a length substantially equal to l).

Subsequently, the pairs (20,27 and 21,28, respectively) are located beside each other in a flat plane and the cross-coupling 29 between the tube parts 27 and 28 is established (see FIG. 2e). Finally, the discharge envelope is exhausted through the open exhaust tubes and the rare gas atmosphere is created, after which the exhaust tubes are sealed and the discharge envelope is filled with mercury vapour (for example in a manner described in GB-PS No. 1,475,458). In the manufacture of lamps having a multitude of four co-extending tube parts, discharge vessels according to the invention are connected to each other by cross-couplings, the ends with redundant electrodes being removed and sealed.

In an alternative embodiment of the method, the tube parts (20,21) are arranged beside the comparatively long tube parts (18,19) (compare FIG. 2c) so that the sealed ends (20a, 21a) are substantially in alignment with the sealed ends 18a and 19a, respectively. The exhaust tubes of each pair then point in the same direction. The cross-coupling (24,25) is then provided near the ends of the said tube parts. Subsequently, the tube parts (18,19) having a length 2l are subdivided into two halves, which results in that configurations as shown in FIG. 2d are obtained.

In a practical embodiment of the lamp of FIG. 1, the length l of the tube parts was equal to 20 cm. The inner diameter of the tube parts was 1.5 cm. The inner diameter of the cross-coupling was approximately 0.6 cm. The cross-couplings were, located at a distance of approximately 13 mm from the respective ends of the tube parts. The inner wall of the tube parts was coated with a luminescent layer consisting of a mixture of two phosphors, i.e. green luminescent terbium-activated cerium magnesium aluminate and red luminescent yttrium oxide activated by trivalent europium. When the lamp was filled with argon (pressure 400 Pa) the luminous flux of the lamp was approximately 1500 lumen with a power supplied to the lamp of 18 W (exclusive of ballast).

1. A method of manufacturing a low-pressure mercury vapour discharge lamp having a discharge vessel sealed in a vacuum-tight manner and comprising four substantially parallel and co-extending glass tube parts, adjacent tube parts being interconnected by a cross-coupling extending transversely to the longitudinal axis so that during operation of the lamp, at least the major part of each of the tube parts and the cross-couplings are traversed by the discharge, in which method the cross-coupling between two tube parts is established after the tube parts to be coupled have been provided with a luminescent layer, and sealed at one end characterized in that first a cross-coupling is formed between a first tube part sealed at one end and having a length $l_1$, whose other end is provided with a stem with an exhaust tube, and a tube part likewise sealed at one end and having a length $l_1 + l_2$, whose other end is likewise provided with a stem with an exhaust tube, which tube parts are arranged adjacent and parallel to each other and are then connected to each other through the cross-coupling which is at or near the sealed end of the first tube part, after which the tube part having a length $l_1 + l_2$ is subdivided so that a second tube part having a length $l_1$ is obtained which is sealed at one end and carriers at its other end the stem with the exhaust tube, which tube part is removed, a tube part having a length $l_2$ sealed at both ends then being obtained which is already connected to the first tube part having a length $l_1$ through a cross-coupling, after which a second pair of tube parts of the same configuration is arranged mirror-symmetrically adjacent the first pair, a cross-coupling being established between the parallel extending tube parts having a length $l_2$.

2. A method as claimed in claim 1, characterized in that all tube parts have a length l, a first cross-coupling being established between two tube parts having a length l and 2l, respectively, the tube part having a length 2l being formed by providing each end of a tube having a length 4l with a stem with an exhaust tube and by subdividing this tube into two halves, the tube part having a length 2l being likewise subdivided into two halves after the first cross-coupling has been established.

* * * * *